United States Patent
Shuto et al.

(10) Patent No.: US 9,916,855 B2
(45) Date of Patent: Mar. 13, 2018

(54) SPINDLE MOTOR

(71) Applicant: Nidec Corporation, Kyoto (JP)

(72) Inventors: Takeyuki Shuto, Kyoto (JP); Toshinari Takeuchi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 16 days.

(21) Appl. No.: 15/348,262

(22) Filed: Nov. 10, 2016

(65) Prior Publication Data

US 2017/0169851 A1    Jun. 15, 2017

(30) Foreign Application Priority Data

Dec. 10, 2015 (JP) ................................. 2015-240873

(51) Int. Cl.
| | |
|---|---|
| *F16C 17/10* | (2006.01) |
| *G11B 19/20* | (2006.01) |
| *F16C 32/06* | (2006.01) |
| *F16C 33/72* | (2006.01) |

(Continued)

(52) U.S. Cl.
CPC ........ *G11B 19/2036* (2013.01); *F16C 17/105* (2013.01); *F16C 32/0607* (2013.01); *F16C 33/72* (2013.01); *F16C 41/005* (2013.01); *F16C 33/74* (2013.01); *F16C 2370/12* (2013.01)

(58) Field of Classification Search
CPC .... F16C 17/026; F16C 17/105; F16C 17/102; F16C 2370/12; G11B 19/2036
See application file for complete search history.

(56) References Cited

U.S. PATENT DOCUMENTS

| | | | | |
|---|---|---|---|---|
| 5,120,139 A | * | 6/1992 | Asada ..................... | F16C 17/02 384/107 |
| 5,516,212 A | * | 5/1996 | Titcomb ................ | F16C 17/107 384/107 |

(Continued)

FOREIGN PATENT DOCUMENTS

| | | |
|---|---|---|
| JP | 2006-040423 A | 2/2006 |
| JP | 2012-152098 A | 8/2012 |

*Primary Examiner* — Thomas R Hannon
(74) *Attorney, Agent, or Firm* — Keating & Bennett, LLP

(57) ABSTRACT

A bearing portion includes an upper dynamic pressure portion, a lower dynamic pressure portion, and an intra-bearing space defined between a lower surface of a fluid in the upper dynamic pressure portion and an upper surface of a fluid in the lower dynamic pressure portion, and not including the fluid. An airway defined in a shaft includes an inner opening arranged to be in communication with the intra-bearing space, and an outer opening arranged to be in communication with an extra-bearing space. Each of the inner and outer openings is defined in a side surface of the shaft. The extra-bearing space and the intra-bearing space are arranged to be in communication with each other through the airway. The airway is arranged to extend substantially in a straight line or lines, is angled with respect to a central axis, and has no other openings than the inner and outer openings. This contributes to preventing a gas inside of a housing from leaking out of the housing through the airway. In addition, since the airway is arranged to extend substantially in a straight line or lines to join the inner and outer openings to each other, the airway can be defined by a single process using a drill, an EDM, or the like.

17 Claims, 8 Drawing Sheets

(51) Int. Cl.
*F16C 41/00* (2006.01)
*F16C 33/74* (2006.01)

(56) References Cited

U.S. PATENT DOCUMENTS

| | | | | |
|---|---|---|---|---|
| 6,144,523 A * | 11/2000 | Murthy | ............ | F16C 17/105 |
| | | | | 360/99.08 |
| 6,296,391 B1 * | 10/2001 | Hayakawa | ............ | F16C 17/026 |
| | | | | 384/107 |
| 6,404,087 B1 * | 6/2002 | Ichiyama | ............ | F16C 33/1065 |
| | | | | 310/90 |
| 6,951,025 B2 * | 9/2005 | Oe | ............ | F16C 17/026 |
| | | | | 369/269 |
| 2006/0023339 A1 | 2/2006 | Fukuyama et al. | | |
| 2012/0162818 A1 | 6/2012 | Sugi et al. | | |
| 2013/0147308 A1 * | 6/2013 | Yu | ............ | F16C 17/107 |
| | | | | 310/216.001 |
| 2013/0308224 A1 | 11/2013 | Sugi et al. | | |
| 2013/0308225 A1 | 11/2013 | Sugi et al. | | |
| 2013/0308226 A1 | 11/2013 | Sugi et al. | | |
| 2015/0179212 A1 | 6/2015 | Sugi et al. | | |
| 2015/0228300 A1 | 8/2015 | Sugi et al. | | |

\* cited by examiner

SPINDLE MOTOR

CROSS REFERENCE TO RELATED APPLICATIONS

This application claims the benefit of priority to Japanese Patent Application No. 2015-240873 filed Dec. 10, 2015. The entire contents of this application is hereby incorporated herein by reference.

BACKGROUND OF THE INVENTION

1. Field of the Invention

The present invention relates to a spindle motor for use in a disk drive apparatus.

2. Description of the Related Art

In recent years, in accordance with increased storage density of disks, there has been a demand for disk drive apparatuses, such as, for example, hard disk drives, to control rotation of the disks, movement of heads, and so on with high precision. In a known hard disk drive (HDD) disclosed in JP-A 2006-40423, a gas arranged in an interior of the HDD is a low-density gas, such as, for example, a helium gas or a hydrogen gas, and the HDD is thus arranged to achieve a reduction in resistance of the gas against a disk, a head, and so on during rotation of a spindle motor. The reduction in the resistance of the gas against the disk, the head, and so on contributes to reducing vibration of the disk, the head, and so on, enabling highly precise data recording.

In the case where the interior of the HDD is filled with a gas such as a helium gas or the like, the helium gas, for example, which has extremely small molecules, tends to easily leak out of the interior of the HDD to an outside of the HDD through a slight gap. Here, a fluid bearing mechanism having a so-called partially-filled structure is sometimes employed in a spindle motor (hereinafter referred to simply as a "motor") installed in the HDD. A motor including a fluid bearing mechanism having the partially-filled structure is described in, for example, JP-A 2006-40423. In a motor having such a fluid bearing mechanism, it is desirable to make air pressure substantially uniform in a space in which fluid surfaces are defined. Accordingly, a shaft of such a motor sometimes includes an airway arranged to join an extra-bearing space to an intra-bearing space in a housing of the motor.

As disclosed in JP-A 2012-152098, for example, a middle gap 63 is arranged to be in communication with a space below a bearing mechanism 4 through a first communicating portion 411a, a hole portion 411, and a second communicating portion 411b. Air pressure in the middle gap 63 is thus arranged to be substantially equal to air pressure in an interior space 143 of a disk drive apparatus 1. As a result, a balance between upper and lower surfaces of a lubricating oil 49 held in a first inclined gap 64 is maintained in a substantially constant state.

The airway is defined by, for example, drilling into an end surface of the shaft using a drill or the like. If the airway is brought into communication with a space other than destination spaces of the airway, such as, for example, a screw hole defined in the shaft, the gas inside the HDD may leak out through the airway.

The present invention has been conceived in view of the above problem to prevent a gas inside of a housing from leaking out of the housing through an airway.

SUMMARY OF THE INVENTION

According to a preferred embodiment of the present invention, there is provided a spindle motor used in a disk drive apparatus to drive a disk, the disk drive apparatus including a housing defining an interior space. The spindle motor includes a bearing mechanism, a stationary portion, and a rotating portion. The bearing mechanism includes a shaft having a central axis as a center thereof. The stationary portion includes a base portion including a through hole in which the shaft is fitted, the base portion defining a portion of the housing. The rotating portion is arranged to rotate about the central axis with respect to the stationary portion through the bearing mechanism. The bearing mechanism includes a bearing portion in which an outer circumferential surface of the stationary portion and an inner circumferential surface of the rotating portion are arranged opposite to each other with a fluid therebetween. The bearing portion includes an upper dynamic pressure portion and a lower dynamic pressure portion each of which includes the fluid and is arranged to generate a fluid dynamic pressure through rotation of the rotating portion; and an intra-bearing space defined between a lower surface of the fluid in the upper dynamic pressure portion and an upper surface of the fluid in the lower dynamic pressure portion, and not including the fluid. The shaft includes an airway defined therein. The airway includes an inner opening defined in a side surface of the shaft, and arranged to be in communication with the intra-bearing space; and an outer opening defined in the side surface of the shaft, and arranged to be in communication with an extra-bearing space defined above or below the bearing mechanism in the interior space. The airway has no other openings than the inner and outer openings. The extra-bearing space and the intra-bearing space are arranged to be in communication with each other through the airway. The airway is arranged to extend substantially in a straight line or lines to join the inner and outer openings to each other, and is angled with respect to the central axis.

According to the above preferred embodiment of the present invention, the airway, which is arranged to make air pressure in the intra-bearing space substantially equal to air pressure in the extra-bearing space, includes no openings other than the inner opening arranged to be in communication with the intra-bearing space and the outer opening arranged to be in communication with the extra-bearing space. Accordingly, a gas inside of the housing is prevented from leaking out of the housing through the airway.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
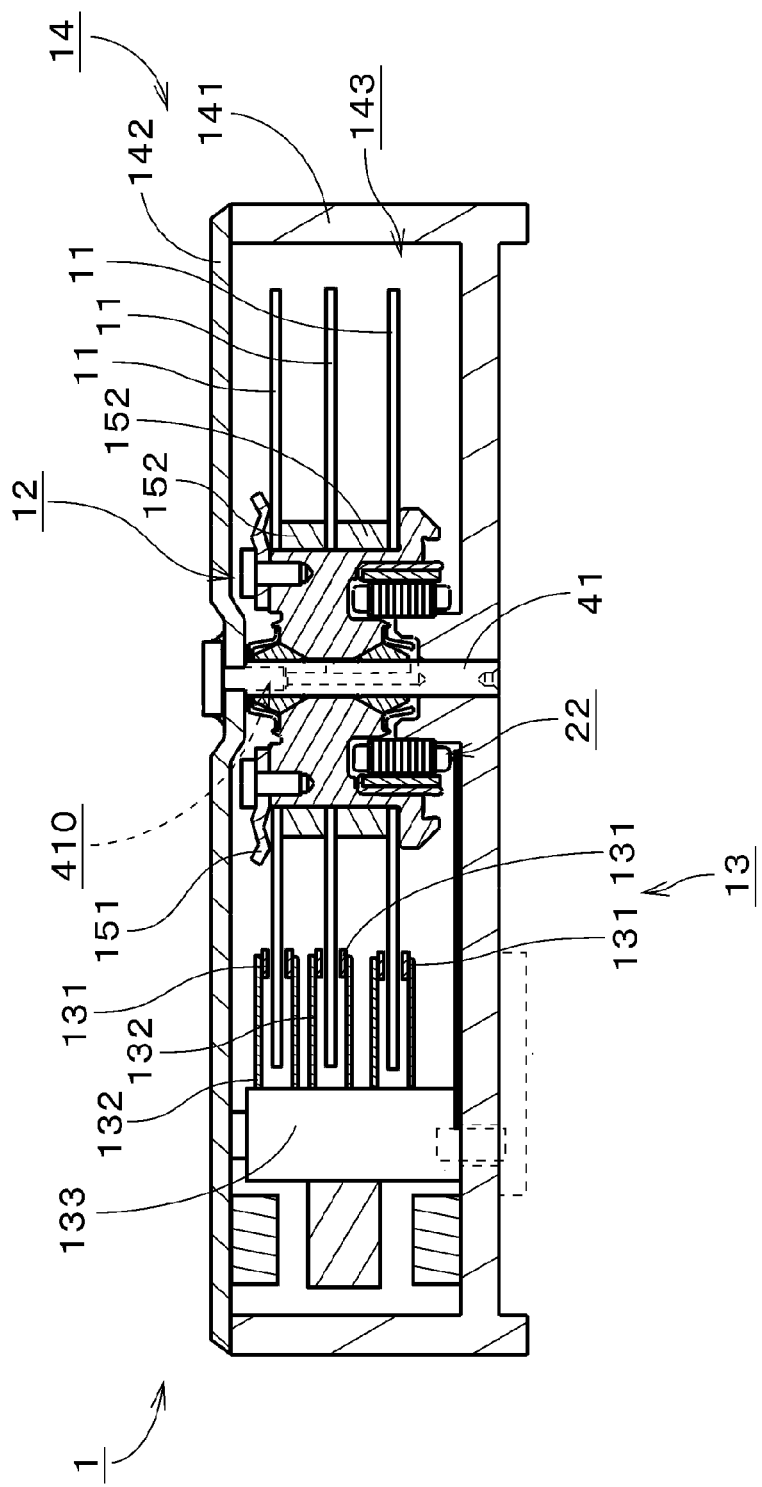
FIG. 1 is a diagram illustrating a disk drive apparatus according to a first preferred embodiment of the present invention.

It is assumed herein that an upper side and a lower side along a central axis of a motor in FIG. 1 are referred to simply as an upper side and a lower side, respectively. It should be noted, however, that the above definitions of a vertical direction and the upper and lower sides are not meant to indicate relative positions or directions of different members or portions when those members or portions are actually installed in a device. Also note that a direction parallel to the central axis is referred to by the term "axial direction", "axial", or "axially", that radial directions centered on the central axis are simply referred to by the term "radial direction", "radial", or "radially", and that a circumferential direction about the central axis is simply referred to by the term "circumferential direction", "circumferential", or "circumferentially".

FIG. 1 is a vertical sectional view of a disk drive apparatus 1 including a spindle motor (hereinafter referred to simply as a "motor") 12 according to a first preferred of the present invention. The disk drive apparatus 1 is a so-called hard disk drive. The disk drive apparatus 1 includes, for example, three disk-shaped disks 11, on each of which information is recorded, the motor 12, an access portion 13, a clamper 151, and a housing 14. The motor 12 is arranged to rotate while holding the disks 11. The access portion 13 is arranged to perform reading and/or writing of information from or to each of the disks 11. Note that the number of disks 11 may not necessarily be three.

The housing 14 includes a first housing member 141, which is substantially in the shape of a box without a lid, and a second housing member 142, which is in the shape of a plate. The disks 11, the motor 12, the access portion 13, and the clamper 151 are accommodated in the housing 14. In the disk drive apparatus 1, the second housing member 142 is joined to the first housing member 141 through, for example, welding or the like to define the housing 14. The housing 14 defines an airtight interior space 143, and extremely little dirt or dust is arranged in the interior space 143. An interior of the housing 14 is preferably filled with a helium gas.

The three disks 11 are arranged at regular intervals in an axial direction through spacers 152, and are clamped by the clamper 151 and the motor 12. The access portion 13 includes six heads 131, six arms 132, each of which is arranged to support a separate one of the heads 131, and a head actuator mechanism 133. Each of the heads 131 is arranged to magnetically read and/or write information from or to a corresponding one of the disks 11 while being arranged in close proximity to the disk 11. The head actuator mechanism 133 is arranged to actuate each of the arms 132 to move an associated one of the heads 131 relative to a corresponding one of the disks 11. The head 131 is thus arranged to make access to a desired location on the rotating disk 11 while being arranged in close proximity to the disk 11, to carry out the reading and/or writing of information.

Figure 2:
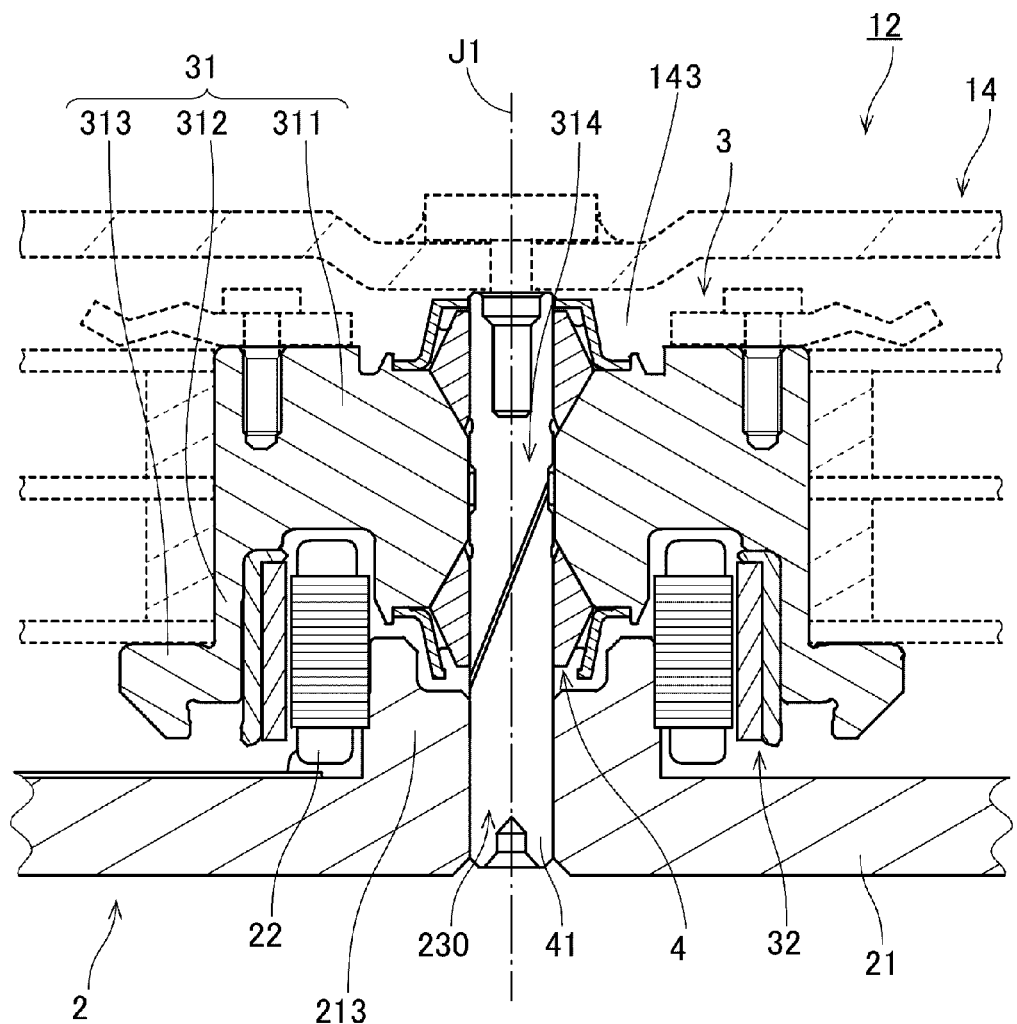
FIG. 2 is a diagram illustrating a motor according to the first preferred embodiment.
Figure 3:
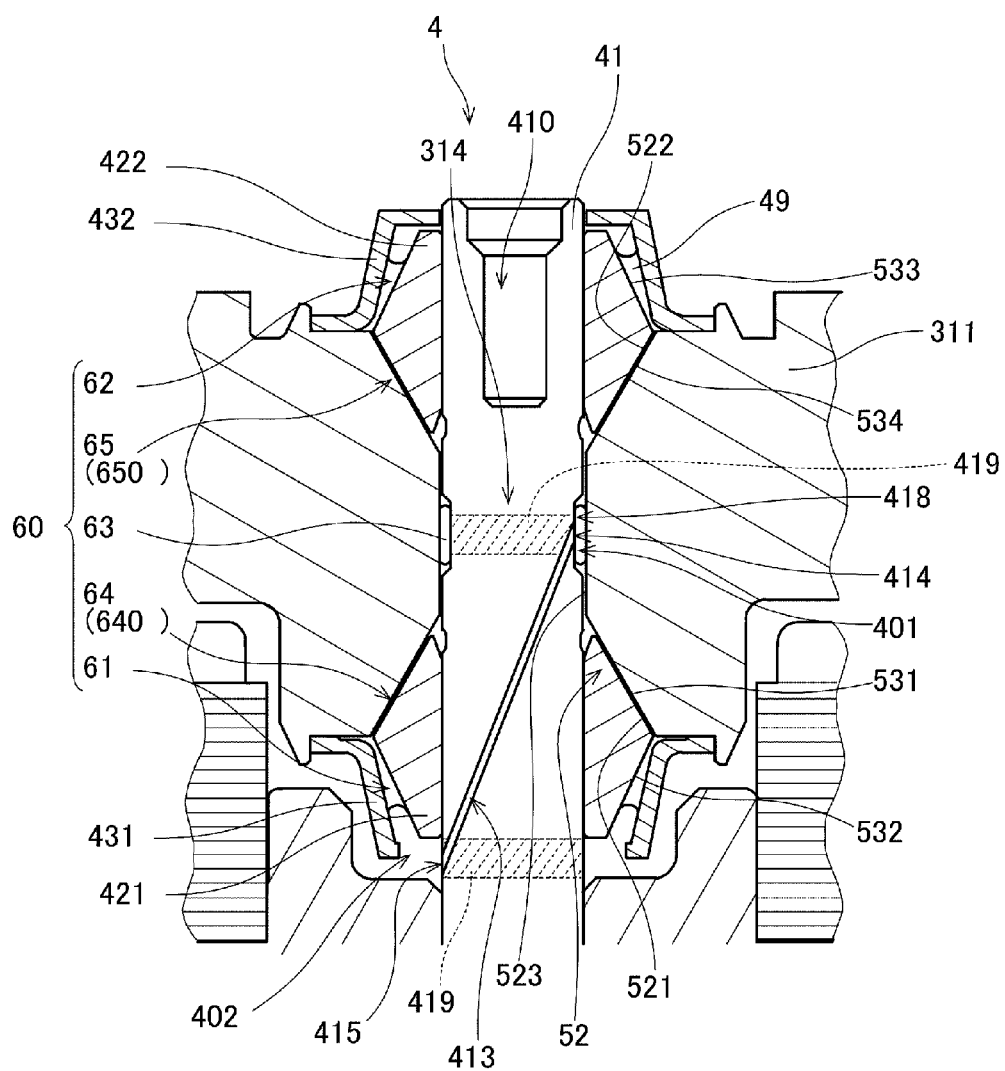
FIG. 3 is a diagram illustrating a bearing mechanism according to the first preferred embodiment.

FIG. 2 is a diagram illustrating the motor 12 according to the first preferred embodiment. FIG. 3 is a diagram illustrating a bearing mechanism 4 of the motor 12 in an enlarged form.

The motor 12 is a spindle motor used in a disk drive apparatus to drive disks, the disk drive apparatus including a housing which defines an interior space. As illustrated in FIG. 2, the motor 12 includes a stationary portion 2, a rotating portion 3, and the bearing mechanism 4. The bearing mechanism 4 includes a shaft 41 arranged to extend in the axial direction. The shaft 41 is a columnar member having a central axis J1 as a center thereof.

The stationary portion 2 includes a stator 22 and a base plate 21, which is an exemplary base portion defining a portion of the housing 14. The base plate 21 includes a through hole 230 in which the shaft 41 is fitted. The through hole 230 is defined in a substantial center of the base plate 21, and is arranged to pass through the base plate 21 in the axial direction. In addition, the base plate 21 includes a cylindrical holder 213 arranged to extend in the axial direction around the through hole 230. The stator 22 is fixed to a circumference of the holder 213.

The rotating portion 3 is supported through the bearing mechanism 4 to be rotatable with respect to the stationary portion 2. The rotating portion 3 is arranged to rotate about the central axis J1 while the motor 12 is in operation. The rotating portion 3 includes a rotor hub 31 and a magnetic member 32. The rotor hub 31 includes a hub body 311, a cylindrical portion 312 arranged to project downward from an outer edge portion of the hub body 311, and a disk mount portion 313 arranged to extend radially outward from the cylindrical portion 312. A central hole portion 314 extending in the axial direction is defined in a center of the hub body 311. The magnetic member 32 is fixed to an inside of the cylindrical portion 312. The magnetic member 32 includes, for example, an annular permanent magnet.

As illustrated in FIG. 3, the bearing mechanism 4 includes the shaft 41, a first cone portion 421, a second cone portion 422, a first cover member 431, a second cover member 432, and a lubricating oil 49. Each of the shaft 41, the first cone portion 421, and the second cone portion 422 belongs to the stationary portion 2. Each of the first cover member 431 and the second cover member 432 belongs to the rotating portion 3.

The shaft 41 is inserted through the central hole portion 314 of the hub body 311. A lower portion of the shaft 41 is fitted in the through hole 230 of the base plate 21. The shaft 41 includes a screw hole portion 410, which is a non-through hole extending downward from an upper end of the shaft 41. A screw is inserted into the screw hole portion 410 to screw the housing 14 to the shaft 41.

The first cone portion 421 is an annular member fixed to the shaft 41 in the vicinity of a lower end portion of the central hole portion 314. An upper portion 531 of an outer circumferential surface of the first cone portion 421 is angled radially outward with decreasing height. A lower portion 532 of the outer circumferential surface of the first cone portion 421 is angled radially outward with increasing height.

The second cone portion 422 is an annular member fixed to the shaft 41 in the vicinity of an upper end portion of the central hole portion 314. An upper portion 533 of an outer circumferential surface of the second cone portion 422 is angled radially outward with decreasing height. A lower portion 534 of the outer circumferential surface of the second cone portion 422 is angled radially outward with increasing height.

The first cover member 431 is attached to a lower portion of the hub body 311, and is arranged opposite to the lower portion 532 of the outer circumferential surface of the first cone portion 421. The second cover member 432 is attached to an upper portion of the hub body 311, and is arranged opposite to the upper portion 533 of the outer circumferential surface of the second cone portion 422.

The lubricating oil 49, which is a fluid, is arranged in a radial gap between a combination of the shaft 41, the first cone portion 421, and the second cone portion 422, and a combination of the hub body 311, the first cover member 431, and the second cover member 432. That is, the bearing mechanism 4 includes a bearing portion 60 in which an outer circumferential surface of the stationary portion 2 and an inner circumferential surface of the rotating portion 3 are arranged opposite to each other with the lubricating oil 49 therebetween. The bearing portion 60 includes a first seal portion 61, a second seal portion 62, a middle portion 63, a first inclined portion 64, and a second inclined portion 65, which will be described below.

A lower portion 521 of an inner circumferential surface 52 of the hub body 311, the inner circumferential surface 52 defining the central hole portion 314, is angled radially outward with decreasing height. The lower portion 521 of the inner circumferential surface 52 is arranged opposite to the upper portion 531 of the outer circumferential surface of the first cone portion 421. The first inclined portion 64, which is angled radially outward with decreasing height, is defined between the lower portion 521 of the inner circumferential surface 52 and the upper portion 531 of the outer circumferential surface of the first cone portion 421.

An upper portion 522 of the inner circumferential surface 52 is angled radially outward with increasing height. The upper portion 522 of the inner circumferential surface 52 is arranged opposite to the lower portion 534 of the outer circumferential surface of the second cone portion 422. The second inclined portion 65, which is angled radially outward with increasing height, is defined between the upper portion 522 of the inner circumferential surface 52 and the lower portion 534 of the outer circumferential surface of the second cone portion 422.

An intermediate portion 523 of the inner circumferential surface 52, which is arranged above the lower portion 521 of the inner circumferential surface 52 and below the upper portion 522 of the inner circumferential surface 52, is arranged to extend along the central axis J1 to assume a cylindrical shape. The intermediate portion 523 of the inner circumferential surface 52 is arranged opposite to an outer circumferential surface of the shaft 41. The middle portion 63, which is arranged to extend in the vertical direction, is defined between the intermediate portion 523 of the inner circumferential surface 52 and the outer circumferential surface of the shaft 41.

The bearing mechanism 4 is a fluid bearing having a so-called partially-filled structure. In the bearing mechanism 4, the first inclined portion 64 defines a lower dynamic pressure portion 640 filled with the lubricating oil 49, which is a liquid, and arranged to generate a fluid dynamic pressure through rotation of the rotating portion 3. Meanwhile, the second inclined portion 65 defines an upper dynamic pressure portion 650 filled with the lubricating oil 49, which is a liquid, and arranged to generate a fluid dynamic pressure through the rotation of the rotating portion 3. Thus, in the bearing mechanism 4, the lubricating oil 49 is held at two separate positions, the first inclined portion 64 and the second inclined portion 65.

An upper surface of the lubricating oil 49 held in the first inclined portion 64 is defined in a lower portion of the middle portion 63. A lower surface of the lubricating oil 49 held in the first inclined portion 64 is defined in the first seal portion 61, which is defined between the first cover member 431 and the first cone portion 421. An upper surface of the lubricating oil 49 held in the second inclined portion 65 is defined in the second seal portion 62, which is defined between the second cover member 432 and the second cone portion 422. A lower surface of the lubricating oil 49 held in the second inclined portion 65 is defined in an upper portion of the middle portion 63.

Accordingly, an intra-bearing space 401, which is a hollow space including no lubricating oil 49, is defined in the middle portion 63. The intra-bearing space 401 is arranged between the lower surface of the lubricating oil 49 held in the upper dynamic pressure portion 650 and the upper surface of the lubricating oil 49 held in the lower dynamic pressure portion 640.

A portion of the outer circumferential surface of the shaft 41 which defines the middle portion 63 includes a recessed portion 418 recessed radially inward. In the present preferred embodiment, the recessed portion 418 is annular, extending all the way around the shaft 41 in the circumferential direction. Accordingly, the middle portion 63 has a greater radial width where the recessed portion 418 is defined than in other portions of the middle portion 63. The recessed portion 418 increases the size of the intra-bearing space 401.

The shaft 41 includes an airway 413 defined therein. The airway 413 includes an inner opening 414 at one end thereof, and an outer opening 415 at an opposite end thereof. Each of the inner opening 414 and the outer opening 415 is defined in a side surface of the shaft 41. The airway 413 has no other openings than the inner opening 414 and the outer opening 415.

The inner opening 414 is arranged to be in communication with the intra-bearing space 401, which is arranged in the bearing mechanism 4. The outer opening 415 is arranged to be in communication with an extra-bearing space 402 defined above or below the bearing mechanism 4 in the interior space 143 defined by the housing 14. The intra-bearing space 401 and the extra-bearing space 402 are thus arranged to be in communication with each other through the airway 413. This makes air pressure in the intra-bearing space 401 and air pressure in the extra-bearing space 402 substantially equal to each other.

The airway 413 having no other openings than the inner opening 414 and the outer opening 415 as described above contributes to preventing a gas inside of the housing 14 from leaking out of the housing 14 through the airway 413.

In a motor disclosed in JP-A 2012-152098, for example, a screw hole portion and an airway are joined to each other. Accordingly, use of a sealant or the like is necessary to prevent a gas in the airway from leaking out of a housing through the screw hole portion. In contrast, in the motor 12 according to the present preferred embodiment, the screw hole portion 410 and the airway 413 are not joined to each other. This prevents the gas inside of the housing 14 from leaking out of the housing 14 through the airway 413 and the screw hole portion 410.

The inner opening 414 and the outer opening 415 are arranged at different circumferential positions. The airway 413 is arranged to extend substantially in a straight line to join the inner opening 414 and the outer opening 415 to each other. In addition, the airway 413 is angled with respect to the central axis J1. Since the airway 413 is arranged to extend substantially in a straight line to join the inner opening 414 and the outer opening 415 to each other, the airway 413 can be defined by a single process using a drill, an electrical discharge machine (EDM), or the like. This leads to a reduction in the number of processes required to manufacture the motor 12.

An excessively large diameter of the airway 413 might lead to a reduction in rigidity of the shaft 41. In the present preferred embodiment, the airway 413 is arranged to have a diameter smaller than a maximum radial width of each of the first and second seal portions 61 and 62, in each of which a surface of the lubricating oil 49 is defined. Such a reasonable diameter of the airway 413 contributes to avoiding a reduction in the rigidity of the shaft 41.

A surface of the shaft 41 includes two oil-repellent agent areas 419 each of which has an oil-repellent agent applied thereonto. The inner opening 414 is defined in an upper one of the oil-repellent agent areas 419. The outer opening 415 is defined in a lower one of the oil-repellent agent areas 419. The oil-repellent agent applied around each of the inner and outer openings 414 and 415 of the airway 413 contributes to preventing the lubricating oil 49 from flowing into the airway 413 even if the lubricating oil 49 approaches a vicinity of any of the inner and outer openings 414 and 415. This in turn contributes to preventing the airway 413 from being closed by the lubricating oil 49, blocking a communication between the intra-bearing space 401 and the extra-bearing space 402.

In the present preferred embodiment, each oil-repellent agent area 419 is an annular area extending all the way around the shaft 41 in the circumferential direction. Note, however, that the oil-repellent agent area 419 may not be an annular area as long as at least the inner opening 414 or the outer opening 415 is included in the oil-repellent agent area 419. Also note that the oil-repellent agent area 419 may be provided at only one of the inner opening 414 and the outer opening 415 which the lubricating oil 49 is the more likely to enter into.

Figure 4:
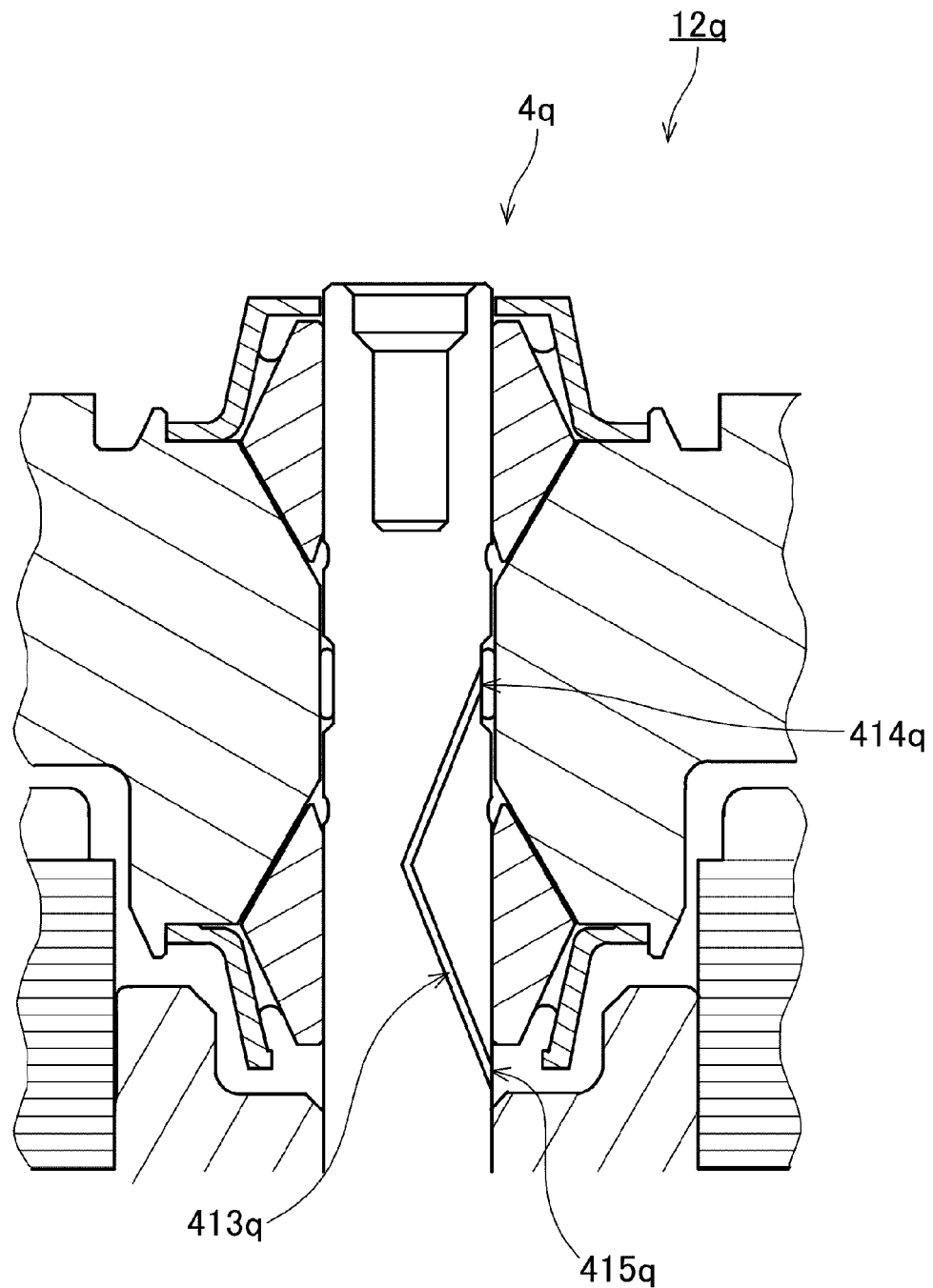
FIG. 4 is a diagram illustrating a bearing mechanism according to a modification of the first preferred embodiment.

FIG. 4 is a diagram illustrating a bearing mechanism 4q of a motor 12q according to a modification of the first preferred embodiment in an enlarged form. In the motor 12q, an airway 413q is substantially in the shape of the letter "V" in a vertical section.

In the modification of FIG. 4, the airway 413q includes a portion extending downward and radially inward in a straight line from an inner opening 414q, and a portion extending upward and radially inward in a straight line from an outer opening 415q. Since the airway 413q is defined by the straight portions each of which is joined to the inner opening 414q or the outer opening 415q as described above, the airway 413q can be easily defined using a drill, an electrical discharge machine, or the like.

Figure 5:
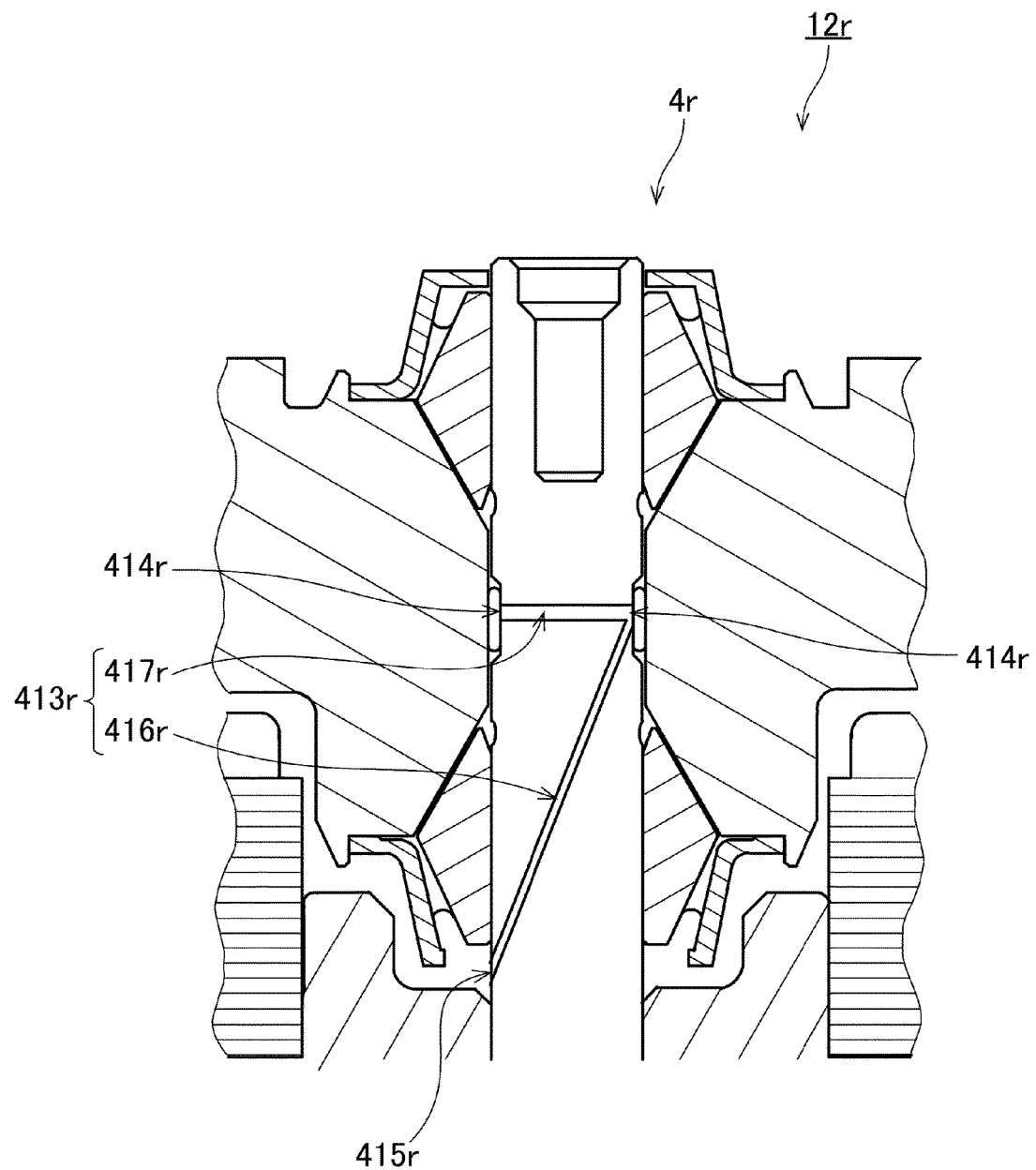
FIG. 5 is a diagram illustrating a bearing mechanism according to another modification of the first preferred embodiment.

FIG. 5 is a diagram illustrating a bearing mechanism 4r of a motor 12r according to a modification of the first preferred embodiment in an enlarged form. The motor 12r includes two inner openings 414r and one outer opening 415r. An airway 413r includes a first channel portion 416r arranged to extend substantially in a straight line to join one of the inner opening 414r and the outer opening 415r to each other, and a second channel portion 417r arranged to extend substantially in a straight line to join the two inner openings 414r to each other.

Figure 6:
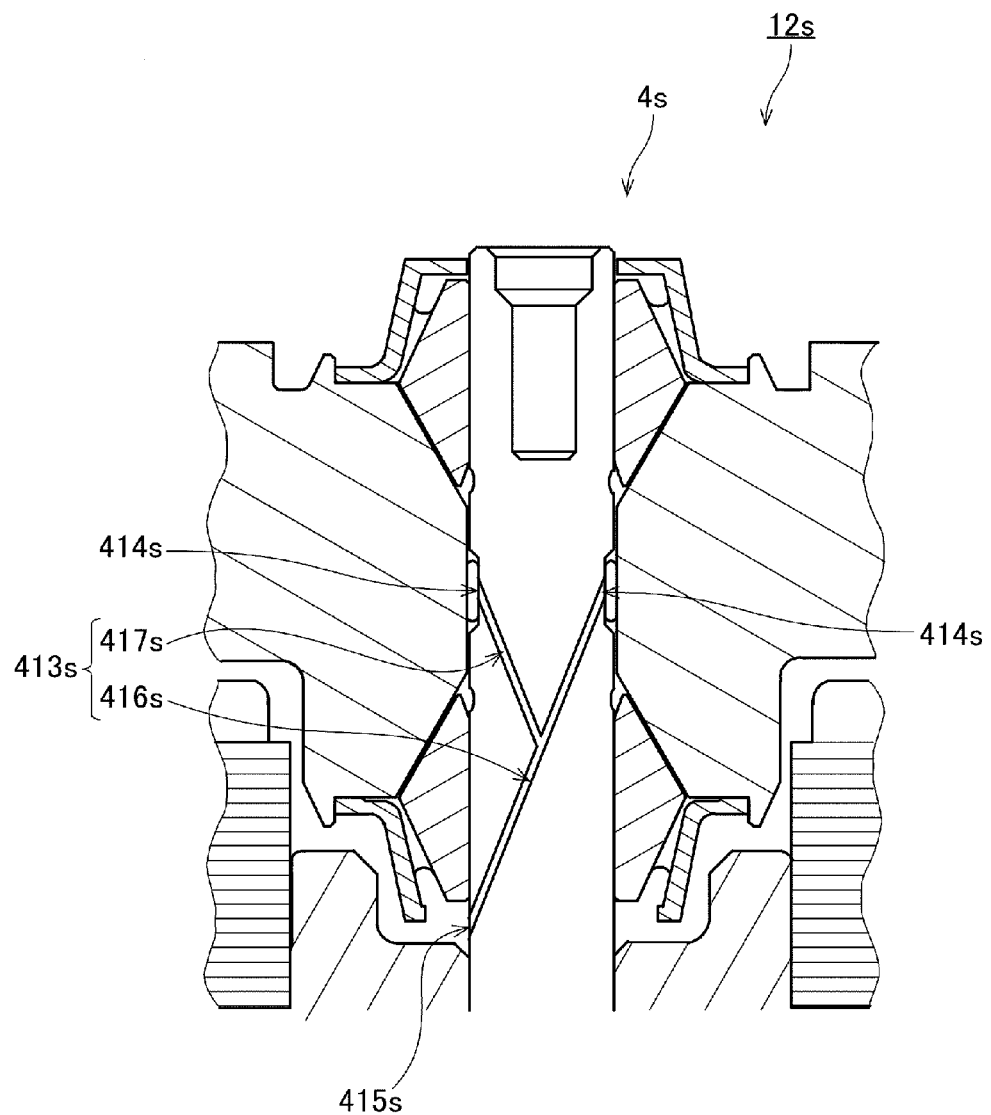
FIG. 6 is a diagram illustrating a bearing mechanism according to yet another modification of the first preferred embodiment.

FIG. 6 is a diagram illustrating a bearing mechanism 4s of a motor 12s according to a modification of the first preferred embodiment in an enlarged form. The motor 12s includes two inner openings 414s and one outer opening 415s. An airway 413s includes a first channel portion 416s arranged to extend substantially in a straight line to join one of the inner openings 414s and the outer opening 415s to each other, and a second channel portion 417s arranged to extend substantially in a straight line to join the other inner opening 414s and a vicinity of a middle of the first channel portion 416s to each other.

As in each of the modification of FIG. 5 and the modification of FIG. 6, the airway may include two inner openings. The two inner openings allow the air pressure in the intra-bearing space to be adjusted at two circumferential positions. This makes it easier to maintain a balance between the fluid surfaces in the upper dynamic pressure portion and the lower dynamic pressure portion.

Figure 7:
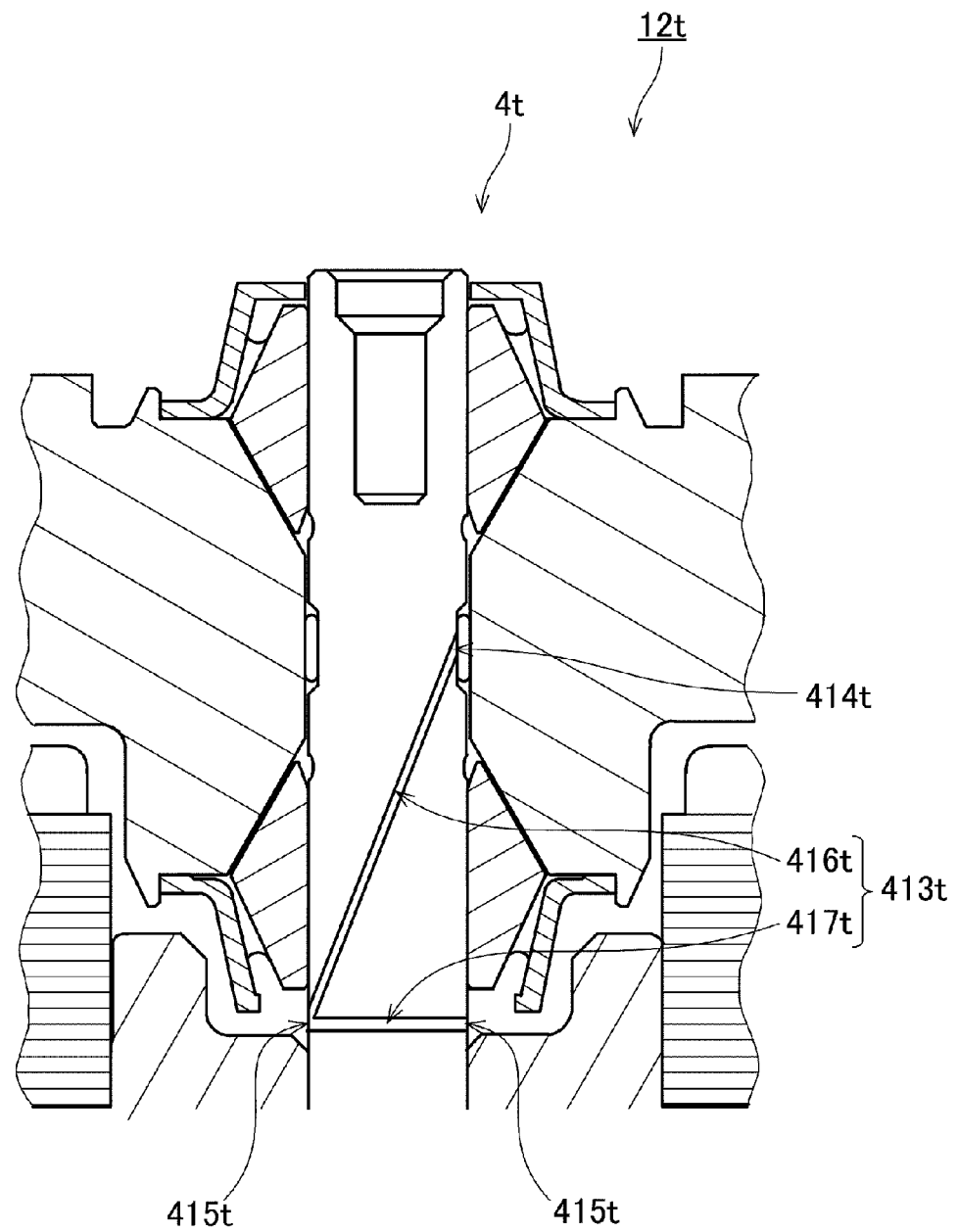
FIG. 7 is a diagram illustrating a bearing mechanism according to yet another modification of the first preferred embodiment.

FIG. 7 is a diagram illustrating a bearing mechanism 4t of a motor 12t according to a modification of the first preferred embodiment in an enlarged form. The motor 12t includes one inner opening 414t and two outer openings 415t. An airway 413t includes a first channel portion 416t arranged to extend substantially in a straight line to join the inner opening 414t and one of the outer openings 415t to each other, and a second channel portion 417t arranged to extend substantially in a straight line to join the two outer openings 415t to each other.

As in the modification of FIG. 7, the airway may include two outer openings. The two outer openings make it easier to make air pressure in the airway substantially equal to the air pressure in the extra-bearing space. This in turn makes it easier to make the air pressure in the intra-bearing space substantially equal to the air pressure in the extra-bearing space to maintain a balance between the fluid surfaces in the upper dynamic pressure portion and the lower dynamic pressure portion.

Note that, in the modification of FIG. 7, the airway may alternatively be arranged to include a first channel portion arranged to extend substantially in a straight line to join the inner opening and one of the outer openings to each other, and a second channel portion arranged to extend substantially in a straight line to join the other outer opening and a vicinity of a middle of the first channel portion to each other.

Figure 8:
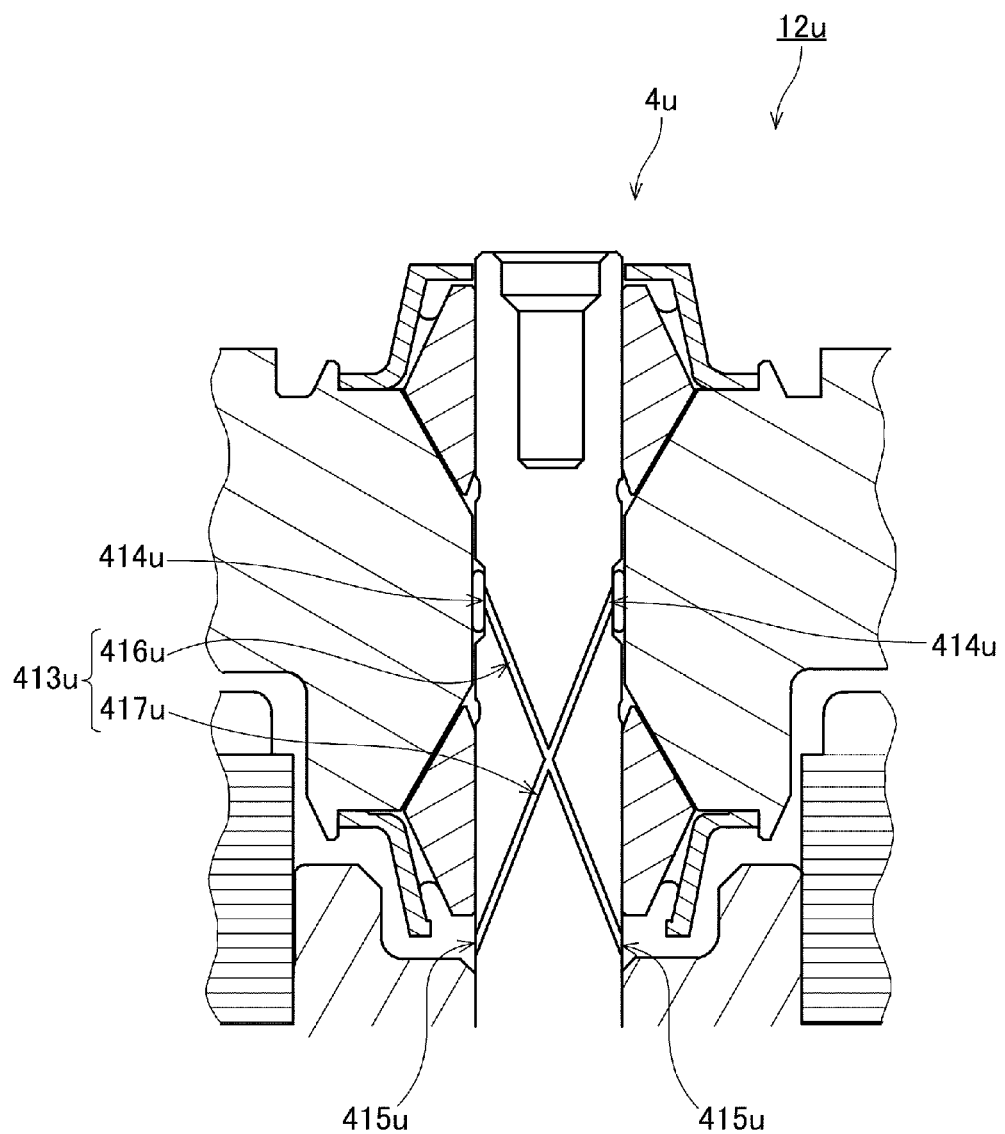
FIG. 8 is a diagram illustrating a bearing mechanism according to yet another modification of the first preferred embodiment.

FIG. 8 is a diagram illustrating a bearing mechanism 4u of a motor 12u according to a modification of the first preferred embodiment in an enlarged form. The motor 12u includes two inner openings 414u and two outer openings 415u. An airway 413u includes a first channel portion 416u arranged to extend substantially in a straight line to join one of the inner openings 414u and one of the outer openings 415u to each other, and a second channel portion 417u arranged to extend substantially in a straight line to join the other inner opening 414u and the other outer opening 415u to each other. The first channel portion 416u and the second channel portion 417u are arranged to cross each other in the form of the letter "X" in a vertical section.

As in the modification of FIG. 8, the airway may include two inner openings and two outer openings. The two inner openings allow the air pressure in the intra-bearing space to be adjusted at two circumferential positions. The two outer openings make it easier to make the air pressure in the airway substantially equal to the air pressure in the extra-bearing space. This in turn makes it easier to make the air pressure in the intra-bearing space substantially equal to the air pressure in the extra-bearing space to retain the positions of the fluid surfaces in the upper dynamic pressure portion and the lower dynamic pressure portion.

Note that, although the outer opening(s) is arranged below the lower dynamic pressure portion in each of the above-described preferred embodiment and the modifications thereof, this is not essential to the present invention. The outer opening(s) may alternatively be arranged above the upper dynamic pressure portion.

Also note that features of the above-described preferred embodiment and the modifications thereof may be combined appropriately as long as no conflict arises. Also note that the detailed shape of any member may be different from the shape thereof according to each of the above-described preferred embodiment and the modifications thereof.

Preferred embodiments of the present invention are applicable to spindle motors for use in disk drive apparatuses.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A spindle motor used in a disk drive apparatus to drive a disk, the disk drive apparatus including a housing defining an interior space, the spindle motor comprising:
   a bearing mechanism including a shaft having a central axis as a center thereof;
   a stationary portion including a base portion including a through hole in which the shaft is fitted, the base portion defining a portion of the housing; and
   a rotating portion arranged to rotate about the central axis with respect to the stationary portion through the bearing mechanism; wherein
   the bearing mechanism includes a bearing portion in which an outer circumferential surface of the stationary portion and an inner circumferential surface of the rotating portion are arranged opposite to each other with a fluid therebetween;
   the bearing portion includes:
      an upper dynamic pressure portion and a lower dynamic pressure portion each of which includes the fluid and is arranged to generate a fluid dynamic pressure through rotation of the rotating portion; and
      an intra-bearing space defined between a lower surface of the fluid in the upper dynamic pressure portion and an upper surface of the fluid in the lower dynamic pressure portion, and not including the fluid;
   the shaft includes an airway defined therein;
   the airway includes:
      an inner opening defined in a side surface of the shaft, and arranged to be in communication with the intra-bearing space; and
      an outer opening defined in the side surface of the shaft, and arranged to be in communication with an extra-bearing space defined above or below the bearing mechanism in the interior space;
   the airway has no other openings than the inner and outer openings;
   the extra-bearing space and the intra-bearing space are arranged to be in communication with each other through the airway; and
   the airway is arranged to extend substantially in a straight line or lines to join the inner and outer openings to each other, and is angled with respect to the central axis.

2. The spindle motor used in the disk drive apparatus according to claim 1, wherein
   the bearing portion further includes a first seal portion defined by the outer circumferential surface of the stationary portion and the inner circumferential surface of the rotating portion in the lower dynamic pressure portion, and a second seal portion defined by the outer circumferential surface of the stationary portion and the inner circumferential surface of the rotating portion in the upper dynamic pressure portion, each of the first and second seal portions including a surface of the fluid defined therein; and
   the airway is arranged to have a diameter smaller than a maximum radial width of each of the first and second seal portions.

3. The spindle motor used in the disk drive apparatus according to claim 2, wherein
   a surface of the shaft includes an oil-repellent agent area having an oil-repellent agent applied thereonto; and
   at least one of the inner and outer openings is defined in the oil-repellent agent area.

4. The spindle motor used in the disk drive apparatus according to claim 3, wherein the airway includes two of the inner openings.

5. The spindle motor used in the disk drive apparatus according to claim 4, wherein the airway includes two of the outer openings.

6. The spindle motor used in the disk drive apparatus according to claim 5, wherein the airway includes:
   a first channel portion arranged to extend substantially in a straight line to join one of the inner openings and one of the outer openings to each other; and
   a second channel portion arranged to extend substantially in a straight line to join another one of the inner openings and another one of the outer openings to each other.

7. The spindle motor used in the disk drive apparatus according to claim 2, wherein the airway includes two of the inner openings.

8. The spindle motor used in the disk drive apparatus according to claim 7, wherein the airway includes two of the outer openings.

9. The spindle motor used in the disk drive apparatus according to claim 8, wherein the airway includes:
   a first channel portion arranged to extend substantially in a straight line to join one of the inner openings and one of the outer openings to each other; and
   a second channel portion arranged to extend substantially in a straight line to join another one of the inner openings and another one of the outer openings to each other.

10. The spindle motor used in the disk drive apparatus according to claim 1, wherein
    a surface of the shaft includes an oil-repellent agent area having an oil-repellent agent applied thereonto; and
    at least one of the inner and outer openings is defined in the oil-repellent agent area.

11. The spindle motor used in the disk drive apparatus according to claim 10, wherein the airway includes two of the inner openings.

12. The spindle motor used in the disk drive apparatus according to claim 11, wherein the airway includes two of the outer openings.

13. The spindle motor used in the disk drive apparatus according to claim 12, wherein the airway includes:
    a first channel portion arranged to extend substantially in a straight line to join one of the inner openings and one of the outer openings to each other; and
    a second channel portion arranged to extend substantially in a straight line to join another one of the inner openings and another one of the outer openings to each other.

14. The spindle motor used in the disk drive apparatus according to claim 1, wherein the airway includes two of the inner openings.

15. The spindle motor used in the disk drive apparatus according to claim 14, wherein the airway includes two of the outer openings.

16. The spindle motor used in the disk drive apparatus according to claim 15, wherein the airway includes:
- a first channel portion arranged to extend substantially in a straight line to join one of the inner openings and one of the outer openings to each other; and
- a second channel portion arranged to extend substantially in a straight line to join another one of the inner openings and another one of the outer openings to each other.

17. The spindle motor used in the disk drive apparatus according to claim 1, wherein the airway includes two of the outer openings.

* * * * *